(12) United States Patent
Van Deventer

(10) Patent No.: US 8,668,279 B2
(45) Date of Patent: Mar. 11, 2014

(54) SYSTEM AND METHOD FOR CONTROLLING AN ELECTRONIC BRAKE

(75) Inventor: Bruce Van Deventer, Lynnwood, WA (US)

(73) Assignee: The Boeing Company, Chicago, IL (US)

( * ) Notice: Subject to any disclaimer, the term of this patent is extended or adjusted under 35 U.S.C. 154(b) by 113 days.

(21) Appl. No.: 13/292,782

(22) Filed: Nov. 9, 2011

(65) Prior Publication Data

US 2013/0112513 A1    May 9, 2013

(51) Int. Cl.
*B60T 8/86* (2006.01)

(52) U.S. Cl.
USPC .............................................. 303/3; 303/126

(58) Field of Classification Search
USPC ...................... 303/3, 7, 15, 20, 126
See application file for complete search history.

(56) References Cited

U.S. PATENT DOCUMENTS

| 4,986,610 A | * | 1/1991 | Beck et al. | 303/176 |
| 5,452,946 A | * | 9/1995 | Warner | 303/24.1 |
| 5,791,442 A | * | 8/1998 | Arnold | 188/138 |
| 6,488,343 B1 | * | 12/2002 | Eberling et al. | 303/15 |
| 6,663,195 B1 | * | 12/2003 | Arnold | 303/122.03 |

FOREIGN PATENT DOCUMENTS

| DE | 102008024019 | 11/2009 |
| DE | 102008042490 | 4/2010 |
| WO | 2011/097973 | 8/2011 |

OTHER PUBLICATIONS

Search Report, European Application No. 12192050.8 (Mar. 14, 2013).

* cited by examiner

*Primary Examiner* — Christopher Schwartz
(74) *Attorney, Agent, or Firm* — Joseph Z. Ellsworth

(57) ABSTRACT

A system for controlling an electronically actuated brake is described. The system includes a plurality of brakes controlled by an electronic brake control unit, a brake pedal, momentary switch contact, and a latching relay. When the brake pedal is deflected beyond a threshold and the momentary switch contact are engaged the electronic brake control unit will communicate to the brakes to change their state between on and off. The present state is saved in the latching relay even when power is removed from the system.

20 Claims, 4 Drawing Sheets

SYSTEM AND METHOD FOR CONTROLLING AN ELECTRONIC BRAKE

FIELD

The invention relates to aircraft parking brakes and more particularly to a system and method for controlling an electronically controlled aircraft braking system.

BACKGROUND

For years transport-category commercial aircraft have utilized hydraulic brakes. Transport-category aircraft are required by law (14 CFR 25.735) to have a parking brake system that will prevent the aircraft from rolling in the most adverse condition of maximum thrust on one engine and up to maximum ground idle thrust on any or all remaining engines.

One type system that meets this requirement is a mechanical system that couples the operation of a hand brake to the brake pedals by means of a lever and pawl mechanism. This mechanism would lock the brake pedals in place when the hand brake is engaged. The amount of clamping force would therefore be consistent and sufficient to overcome the most adverse condition. Some known disadvantages of this system are that the brake clamped force is always at a maximum which causes wear on the brake and that hydraulic pressure may eventually bleed away, thereby releasing the applied pressure on the brake.

Electrical brakes have since replaced direct hydraulic brakes and are able to provide variable brake clamping force. When the aircraft is at rest, the amount of clamping force required to prevent rolling is minimal. However, when the engines produce thrust, electrical brakes are able to adjust the amount of clamping force to prevent the aircraft from rolling.

Aircraft brakes must also be permanent and non-volatile such that when aircraft power is turned off a locking mechanism will prevent brake clamp force from being removed. Additionally, an interlocking approach must be used so that no single control application flight crew can inadvertently set or inadvertently release the parking brake. Furthermore, no single failure of any component or wire should allow the parking brake function to be activated or deactivated. Electrical brake control systems utilize a locking lever, similar to that used in hydraulic braking systems, for two reasons: the lever provides a familiarity to pilots who are used to operating hydraulic brake systems, and the lever provides a non-volatile state storage and indication for the electrical brake system. The actuators on the electric brake itself contain frictional locking devices which, when set, mechanically lock the actuator in a specific position such that the brake clamping force is retained even after aircraft and braking electrical power are removed.

Park Brake Lever systems require the design of a device to act like the lever and pawl mechanism of hydraulic braking systems. This system is of limited reliability because of its mechanical design which may lead to failures. Mechanical wear or failure of the mechanical switches may cause the lever to indicate a false positive, a false negative, or may be placed in a mode where lever position is out of sync with the parking function.

One type of parking brake mechanism known in the art includes a park brake lever module that includes a lever, two micro switches and a solenoid. The lever includes a stop tab for defining the full travel of the lever, a locking tab that keeps the lever from being inadvertently raised, and two switch actuator tabs that are used to actuate and keep actuated the two micro switches. One micro switch is referred to as the Not Release Switch that indicates "Release" when not activated and "Not Release" when actuated. The second micro switch is referred to as the Set Switch and indicates "Not Set" when not actuated and "Set" when actuated. As the lever is moved it engages the "Not Release Switch." If the pilot then depresses the brake pedals, the combination of pedal input and actuation of the "Not Release Switch" activates a solenoid, which allows the lever to continue to travel to its full extent. At full extent, the "Set Switch" indicates that the parking brake is set. Releasing the pedals will allow the unlocking solenoid to lock the lever in the up position. Depressing the pedals again (with the "Not Release Switch" closed) will activate the unlock solenoid which then will allow free movement of the lever so that it can be lowered, thus disengaging the parking brake function.

The braking system may include a variety of modes, such as the Engine Run Park Mode, Park and Adjust Mode and Normal Brake Mode. Each of these modes may apply a different level of frictional braking depending on the amount of thrust applied to the aircraft. In Park and Adjust Mode, for example, the friction brakes may apply a minimum of 25% clamping force. In Engine Run Park Mode the friction brakes may apply up to 100% of clamping force.

Therefore, there exists a need in the art for an aircraft parking brake system that eliminates mechanical elements.

There further exists a need in the art for an aircraft parking brake system that utilizes a dual-input to prevent accidental engagement of the parking brake system.

There further exists a need in the art for an aircraft parking brake system that eliminates the potential for false positives and negatives.

SUMMARY

One aspect described is a system for controlling an electronically actuated brake that comprises a plurality of brakes, a brake pedal, an electronic brake control unit, a latching relay and a momentary switch contact. When the brake pedal is pressed over a certain deflection and the momentary switch contact is engaged, the plurality of brakes change their state between on and off and a present state is saved in a non-volatile latch mechanism.

According to further embodiments, the non-volatile latch mechanism may control the state of the brakes. The non-volatile latch mechanism may be a solid state device or may include a state saver latch and a latching relay. The system may also include an indicator lamp for indicating the state of the brakes.

According to a second aspect an apparatus for electrically controlling a braking system is disclosed. The apparatus may include a brake control unit in communication with the braking system, a brake pedal in communication with the brake control unit and a momentary switch in communication with a latch mechanism and the brake control unit. When the switch and pedal are engaged, the latch mechanism switches between a first and second state. The state is communicated to the brake control unit which engages a parking brake function of the braking system when the latch is in the second state.

According to one embodiments of the above aspect, the brake pedal may be an electronic input that varies with an angular deflection of the brake pedal. When the brake pedal is deflected to a threshold and the momentary switch contact is engaged, the latch mechanism switches from the first to second state.

According to a further embodiment, the brake control unit may include a normal mode where the brakes are applied according to the angular deflection of the brake pedal and the braking system is applied according to the thrust of the aircraft when the brake control unit is in the parking brake mode. The first state of the latch mechanism may correspond to the normal mode.

The latch mechanism may also be non-volatile such that the state of the latch, in either the first or second state, is maintained when power to the apparatus is removed. According to one variation, the latch mechanism is a solid state relay.

According to another aspect a method for controlling a frictional braking system of an aircraft is described. A brake command, electronic latch, brake pedal and momentary switch are provided. The electronic latch includes a first state and a second state and the brake command includes a normal mode and a parking brake mode. When the electronic latch is in the first state the brake command is in the normal mode and when the electronic latch is in the second state the brake command is in the parking brake mode. The latch may be switched between the first and second state by depressing the brake pedal beyond a threshold and engaging the momentary switch. The state of the electronic latch is maintained when power is removed.

According to one embodiment of this aspect, the brake command controls the frictional braking system according to the deflection of the brake pedal when in the normal mode. When in the parking brake mode the brake command controls the braking system according to aircraft thrust. An indicator lamp may also be provided that conveys the state of the electronic latch. The electronic latch may be a solid state relay or 2-coil latching relay and may be selectively energized only when the brake pedal is depressed.

The features, functions, and advantages that have been discussed can be achieved independently in various embodiments of the present invention or may be combined in yet other embodiments further details of which can be seen with reference to the following description and drawings.

DETAILED DESCRIPTION

Figure 1A:
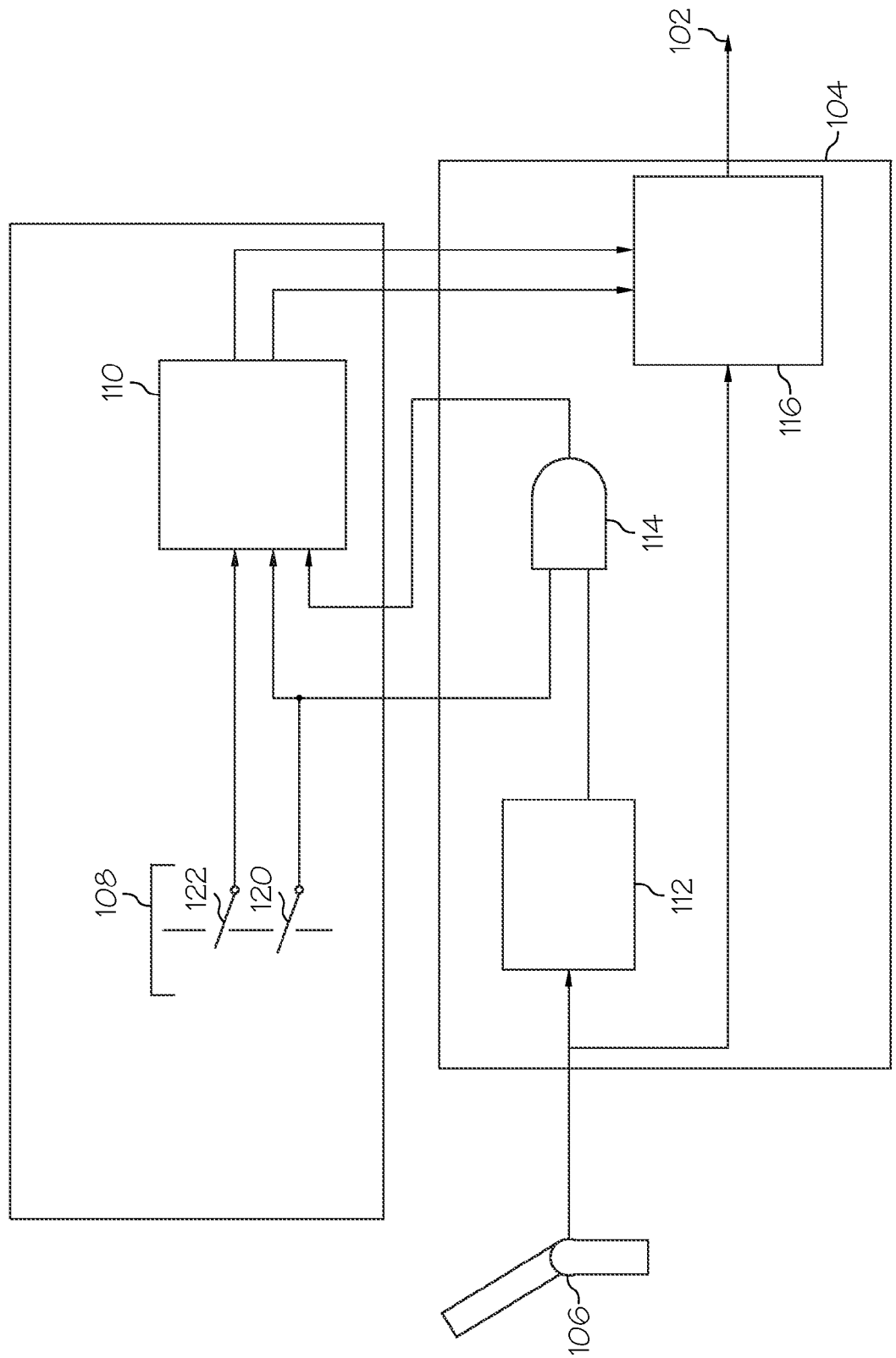
FIG. 1A is a diagram of one embodiment of an electronic braking system.

An aircraft or other vehicle having a brake system may include a wheeled system (landing gear in an aircraft), a plurality of brakes for resisting motion of the wheeled system, one or more brake pedals for indicating the degree of braking, a parking brake and an electronic braking system for controlling. The electronic braking system controls the aircraft brakes in response to the deflection of the pedals and may selectively engage a parking brake.

The electronic braking system 100 is illustrated in FIG. 1. The system 100 may include a brake actuation system 102, a brake control unit 104, a brake pedal 106, pushbutton 108 and a non-volatile latch module 110. Within the brake control unit 104 is a pedal sensor 112, AND gate 114, and brake command logic 116. The park brake control function of an electronic braking system, according to another embodiment, may include an OR gate 118.

The brake actuation system 102 may be coupled to an aircraft landing gear wheel system (not shown) to selectively inhibit rotational movement of the landing gear wheels. The braking system may be frictional brakes such as, without limitation, band brakes, drum brakes, or disc brakes. Other braking systems are contemplated. According to one example, the braking system is hydraulically controlled.

The brake actuation system 102 is directly controlled by the brake command logic 116 as part of the brake control unit 104. The brake command logic 116 may control the brake actuation system 102 to provide a proportional response from the brake pedal 106 or a locked response when it is desired for the parking brake to be engaged. The proportional response preferably engages the brakes at a rate proportional to the deflection of the brake pedal 106 to slow or stop the aircraft during normal operation, such as taxing and landing. The locked response preferably engages the brakes at a minimum parking level when the aircraft is unpowered and up to a peak braking level when one engine is at full thrust and other engines are idling (the most adverse condition defined by 14 CFR 25.735) to prevent the aircraft from rolling.

The brake control unit 104 is shown in further detail in FIG. 1 and includes a pedal sensor 112, AND gate 114 and brake command logic 116. The position of the pedal is determined by the pedal sensor 112 and electronically communicated to the brake command logic 116 which directly controls the brake actuation system 102 to apply the brakes to the aircraft wheels. If the pedal sensor 112 detects that the aircraft brake pedal 106 has been deflected above a threshold (for example, 90%) then a positive signal is electrically or logically communicated to the AND gate 114. This AND gate 114 compares an electrical input from the pushbutton 108 and pedal sensor 112 and if both are positive then a positive signal is electrically communicated from the AND gate 114 to the non-volatile latch module 110.

The aircraft brake pedal 106 may be, for example, an analog device that communicates an output voltage proportional to the deflection of the pedal 106. Alternatively, the pedal 106 may be a digital device, variable resistor, or other apparatus that electrically communicates the degree of deflection of the pedal 106 to the pedal sensor 112. The brake pedal 106 may be a single or multiple foot-actuated pedals, hand-actuated lever, dial, or other apparatus which may be engaged by a pilot to convey the degree of braking desired.

Figure 1B:
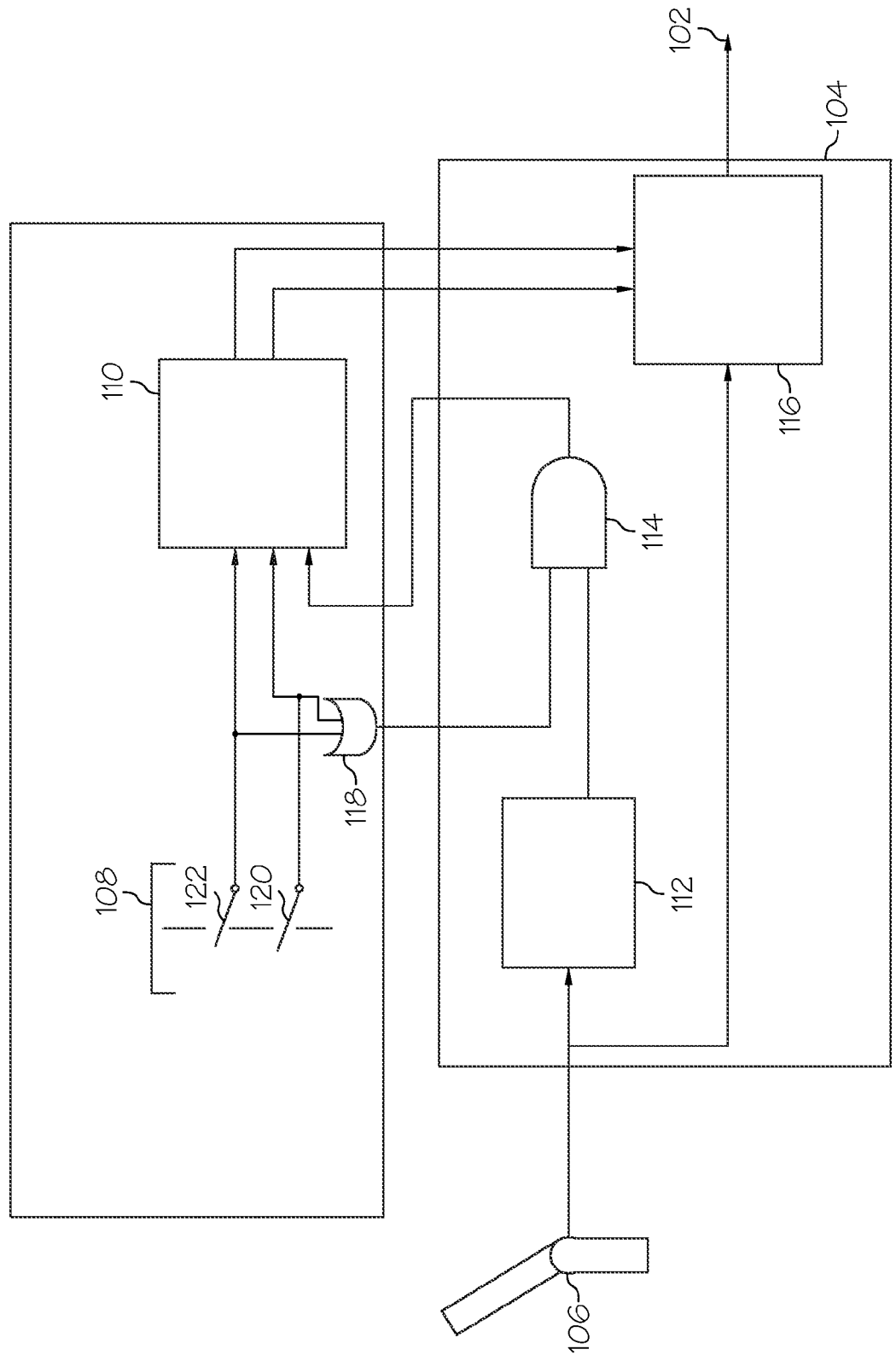
FIG. 1B is a diagram of an alternative embodiment of the electronic braking system.

The pushbutton 108 may include two momentary switch contacts 120, 122 as shown in FIG. 1A, so that when the pushbutton 108 is depressed an electrical signal is communicated by the momentary switch contacts 120, 122 to the non-volatile latch module 110 and the AND gate 114. According to the exemplary embodiment, the pushbutton 108 is a momentary switch in the form of a pushbutton, but it may also be appreciated that pushbutton 108 may be any other type of momentary or toggle switch that communicates a signal to the non-volatile latch module 110 indicating that the state of the non-volatile latch module 110 should change states. According to one variation, the pushbutton 108 may be replaced with a hall effect sensor and magnet.

According to one embodiment shown in FIG. 1A, the pushbutton 108 includes two momentary switch contacts 120, 122 where the first contact 120 is in communication with the non-volatile latch module 110 and the second contact 122 is in communication with the non-volatile latch module 110 and the AND gate 114 in the brake control unit 104. According to an alternative arrangement shown in FIG. 1B, both of the momentary switch contacts 120, 122 may be in communication with an OR gate 118 and the non-volatile latch module 110. The OR gate 118 is in electrical communication with the AND gate 114 of the brake control unit 104. This arrangement provides a redundancy so that if either of the momentary switch contacts 120, 122 fails then a positive signal may still be communicated to the AND gate 114 when the pushbutton 108 is engaged.

The non-volatile latch module 110 may receive three inputs from the pushbutton 108 and brake control unit 104. All of these will be positive when the brake pedal 106 is depressed beyond the threshold level and the pushbutton 108 is engaged. These may be performed in any order, either first depressing the brake pedal 106 and then depressing the pushbutton 108 or first depressing the pushbutton 108 and then the brake pedal 106. The non-volatile latch module 110 may also include two outputs that communicate with the brake command logic 116 to indicate that the parking brake should be set and not release. A third output from the non-volatile latch module 110 may connect to an indicator bulb, LED, or otherwise signal to a pilot or other personnel that the parking brake is engaged.

Figure 2A:
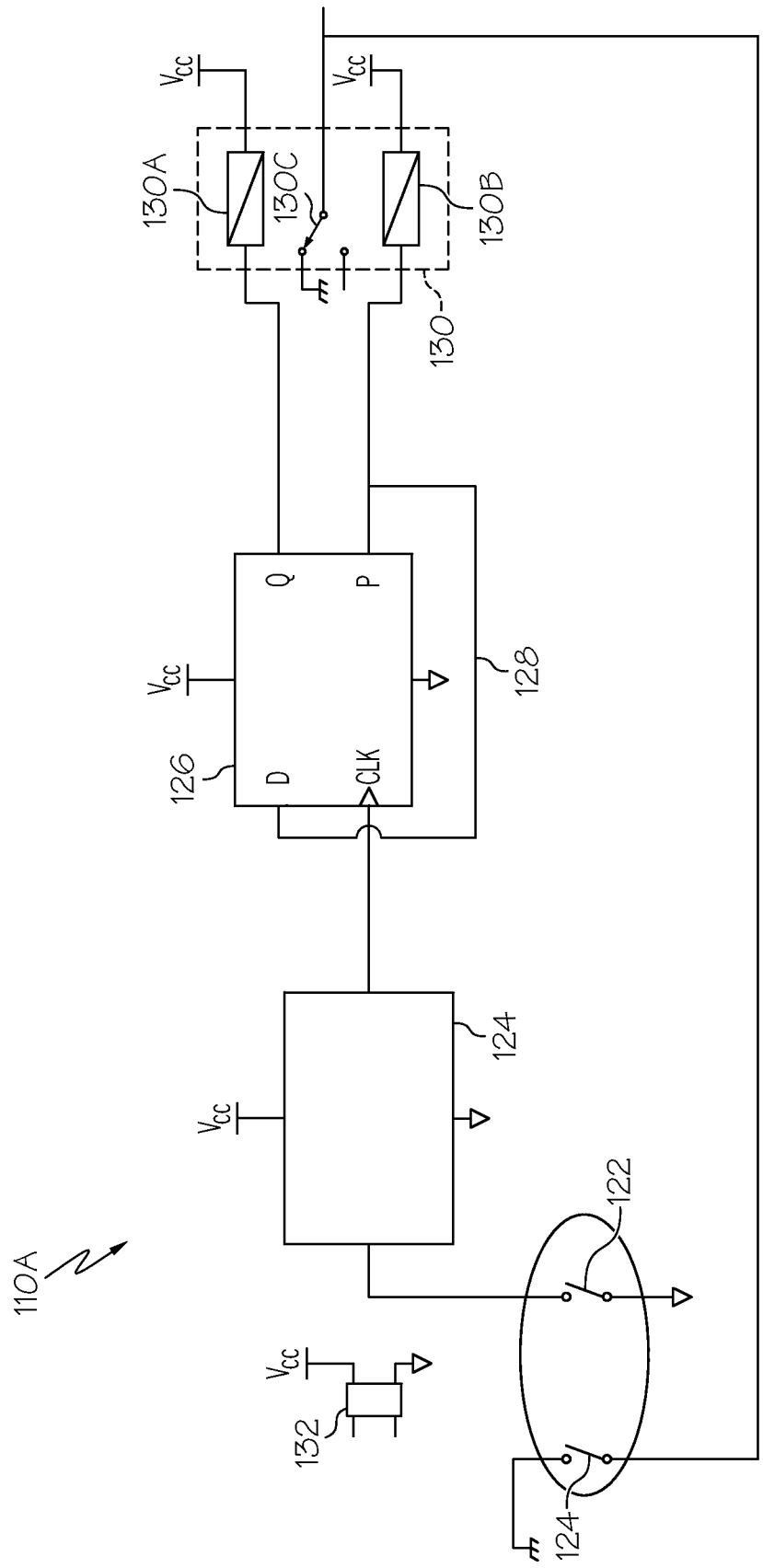
FIG. 2A is a diagram of one component of one embodiment of a non-volatile latch mechanism.
Figure 2B:
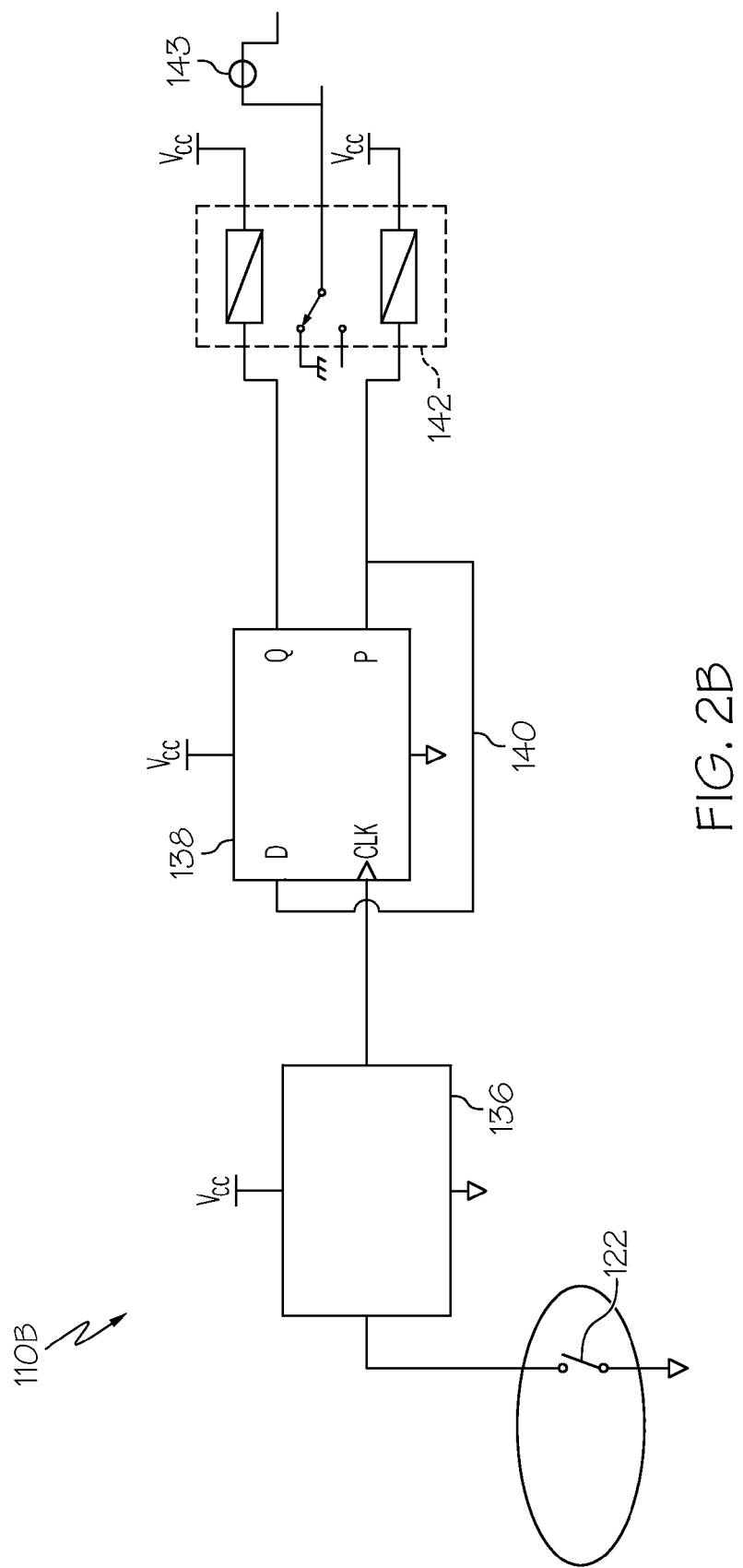
FIG. 2B is a diagram of a second component of the non-volatile latch mechanism embodiment shown in FIG. 2A.

FIGS. 2A-B show the internal circuitry of the non-volatile latch module 110. The non-volatile latch module 110 may fully or partially constructed from solid state circuits, integral circuits, circuit board, or other types of circuit technology. The non-volatile latch module 110 may include a not-release switch component 110A and a set switch component 110B.

FIG. 2A shows the circuitry for the not-release switch component 110A that forms part of the non-volatile latch module 110. This module concept includes internal non-volatile parking brake state latching so that the state of the not-release switch component 110A (ON or OFF) is maintained even when the system is unpowered.

As shown in FIG. 2A, the second momentary switch contact 122 provides a signal to a debounce element 124, that eliminates erratic action that may result when the switch is depressed. The signal is communicated to a state saver latch 126 (for example, a F-RAM latch or EEPROM) that triggers between a high and low output voltage when an input is received.

In the embodiment illustrated, output from the debounce element 124 is received by the state saver latch 126 clock input CLK. When the clock input CLK receives a rising edge (for example due to transitioning between a low and high signal) the state of an input D is copied to a first output Q. Therefore, when input D is high, then when the pushbutton is engaged first output Q will be set to high; when input D is low and a rising edge is received by clock input CLK the first output Q will be low. A second output P from the state saver latch 126 will be set to equal the opposite of the input D, expressed as P=NOT Q. A crossover toggle inverter 128 connects P to D so that when the system is toggled, D switches between a high and low input. In this manner, every time a rising edge is received by clock input CLK the voltage at first Q and second P outputs will toggle between high and low values.

The first Q and second P outputs of the state saver latch 126 are coupled to a relay 130 that may be an electromechanical, electrical, solid state, or other relay. According to one embodiment, the relay 130 is a two-coil latching relay designed for aerospace operations, but the relay 130 may also be a normally closed or normally open single latch relay. A two-coil latching relay 130 that maintains its state when unpowered may be preferred as it does not require energy to maintain a positive output signal for the output of the not-release switch component 110A. According to one embodiment, the relay 130 is an electromagnetically actuated 2-coil latching relay. The non-volatile latch mechanism 110 may also be a solid state device and the relay 130 may be a solid state relay. A first coil 130A is coupled to the first output Q of the state saver latch 126 and the second coil 130B is coupled to the second output P of the state saver latch 126. When one of the coils is energized the switch 130C is flipped in that direction. The relay 130 in FIG. 2A is shown with the output of the not-release switch component 110A in the OFF position. When a signal received by the state saver latch 126 switches the outputs of P and Q, the relay 130 will switch positions and deliver an ON signal, which may be indicated by a current flow or voltage difference.

According to one embodiment illustrated in FIG. 2A, a power converter 132 is coupled to the output of the AND gate 114 so that when the pedal and button are depressed the internal circuitry of the not release switch component 110A is energized. The converter 132 may be a transformer and rectifier or other means well known in the art. As shown, the debouncer 124, state saver latch 126 and relay 130 are coupled to Vcc and ground.

As further shown, the not release switch component 110A may be self-powered by utilizing the output from the AND gate 114. This power is converted into usable form via power converter 132. bipolar latching relay 130 is used to generate the NOT RELEASE switch signal and is wired to contact 120 ganged pushbutton switch, so that either the pushbutton or the relay can close the switch to ground, which is needed by the brake control logic to provide power to the solenoid circuitry 132. The toggling logic implemented by the inverting wrap-around or state-saver latch 126 will then drive the latching relay to the opposite state for this signal.

FIG. 2B shows the circuitry for the set switch component 110B of the non-volatile latch module 110. Similar to the not release switch component 110A, the set switch component 110B includes a debouncer 136, state saver latch 138, cross-over toggle inverter 140 and relay 142 in a similar arrangement. The set switch component 110B may also be energized by the parking brake solenoid as discussed above. As with the not release switch component 110A the momentary switch contact 122 delivers the signal to the debounce element 136.

The non-volatile latch mechanism 110 is shown as two separate components, the not release switch component 110A and the set switch component 110B. However, it may be appreciated by those having skill in the art that the components may be integrated such that one or more of the debounce elements 124, 136, state saver latches 126, 138 and relay 130, 142 may be shared between these components.

Also disclosed is a method of controlling an electronic brake system in an aircraft or other vehicle having an electronic braking system.

The method may include manipulation of an aircraft brake pedal 106 and parking brake pushbutton 108 shown in FIG. 1. When the pedal 106 is depressed it communicates with the brake command logic 116 to apply braking to the brake actuation system 102 at a level according to the amount the brake pedal 106 has been depressed. When the pedal 106 is depressed at or above a threshold level detected by a pedal sensor 112 a signal is communicated to the AND gate 114. If the pushbutton is depressed while the pedal 106 is engaged beyond the threshold then the AND gate 114 will output a positive response to the non-volatile latch mechanism 110 which toggles the desired parking brake state and signals the brake command logic 116 to engage the parking brake.

Upon receiving an input from the pushbutton 108, the non-volatile latch mechanism 110 alters the signal from the not release switch 110A and set switch 110B components. When the momentary switch contact 122 is engaged, the output may make multiple transitions before fully opening or closing. This brief period is rectified by the debounce element 124 to create a sharp signal rise. The signal rise is communicated to the clock input CLK of the state saver latch 126.

When the clock input CLK is received, the value of the first output Q will be set equal to the input D and the value of the second output P will be set equal to NOT Q. A crossover toggle inverter 128 redirects the second output P to the input D, thereby inverting the state saver latch 126. The first Q and second P outputs of the state saver latch 126 are communicated to a relay 130. When the first output Q is low, current will flow through the first coil 130A of the relay 130, causing the switch 130C to go to the ground terminal. This causes current to flow through the not release switch output. When the first output Q is high then the second output P (NOT Q) will be low, causing current to flow through the second coil 130B, thereby attracting the switch 130C to a voltage, preventing current flow through the not release switch output.

The not release switch component 110A may also include a grounding line 134 that selectively couples the output of the not release switch component 110A to ground when the first momentary switch contact 120 is engaged. This allows the solenoid to be energized on a button press, whether the parking brake is engaged or not, thereby powering the internal circuitry by means of the power converter 132 as discussed above.

The set switch component 110B may operate similarly to the not release component 110A.

According to one embodiment, an indicator lamp 143 may be incorporated into said pushbutton or non-volatile latch mechanism 110 for indicating the state of the brakes. The indicator lamp 143 may also be positioned elsewhere in the aircraft cockpit to indicate to the pilot that the parking brake is engaged.

While the method and forms of apparatus disclosed herein constitute preferred aspects of the disclosed parking brake control apparatus and method, other methods and forms of apparatus may be employed without departing from the scope of the invention.

What is claimed is:

1. A system for controlling an electronically actuated brake, the system comprising:
    a brake actuation system;
    a brake pedal;
    an electronic brake control unit configured to operate in a normal mode and a parking brake mode, the electronic brake control unit connected to receive a signal from the brake pedal when the brake pedal is depressed;
    a non-volatile latch module connected to receive an output from the electronic brake control unit and output to the electronic brake control unit; and
    a momentary switch contact connected to output to the electronic brake control unit and to the non-volatile latch module;
    the electronic brake control unit further configured to operate in the parking brake mode when the brake pedal is deflected at or beyond a threshold deflection and the momentary switch contact is engaged, such that when changed to the parking brake mode the electronic brake control unit outputs a signal to the non-volatile latch mechanism and receives one of an on and an off signal from the non-volatile latch mechanism and the electronic brake control unit communicates with the electronically actuated brake to change its state between on and off, and a present state of the electronically actuated brake is saved in the non-volatile latch mechanism.

2. The system of claim 1, wherein said present state in said non-volatile latch mechanism controls the state of a plurality of the electronically actuated brakes.

3. The system of claim 1, wherein said non-volatile latch mechanism is a solid state device.

4. The system of claim 1, wherein said non-volatile latch mechanism includes a state saver latch and a latching relay.

5. The system of claim 1, wherein said system further includes an indicator lamp for indicating the state of the electronically actuated brake.

6. An apparatus for electrically controlling a braking system having a plurality of brakes, the apparatus comprising:
    a brake control unit in communication with said braking system, the brake control unit configured to operate in a normal mode and a parking brake mode;
    a brake pedal in communication with said brake control unit; and
    a momentary switch in communication with said brake control unit, and in communication with a non-volatile latch module;
    said brake control unit further configured to operate in said parking brake mode when said momentary switch is engaged and said parking brake is deflected at or beyond a threshold deflection, and when said brake control unit changes to said parking brake mode said latch mechanism is toggled between a first state and a second state such that said plurality of brakes is on in said first state and said plurality of brakes is off in said second state.

7. The apparatus of claim 6, wherein said brake pedal is an electronic input.

8. The apparatus of claim 7, wherein said electronic input varies with an angular deflection of said brake pedal.

9. The apparatus of claim 8, wherein said non-volatile latch module maintains a present one of said first state and said second state when power is removed from said non-volatile latch module.

10. The apparatus of claim 9, wherein said braking system is an aircraft braking system and in said normal mode said braking system is applied according to the angular deflection of said brake pedal and wherein said brakes are applied according to an engine thrust of the aircraft when said braking system is in said parking brake mode.

11. The apparatus of claim 10, wherein said non-volatile latch module is configured to receive signals from a first and a second momentary switch contact.

12. The apparatus of claim 6, wherein said brake control unit includes an AND gate configured to receive a signal from said brake pedal and said momentary switch, and to output to said non-volatile latch module when a signal is received from said momentary switch and said brake pedal is depressed at or beyond said pre-set threshold.

13. The apparatus of claim 12, wherein said non-volatile latch module is configured to output to said brake control unit in said parking brake mode.

14. A method for controlling a frictional braking system of an aircraft, the method comprising:
    providing a brake command having a normal mode and a parking brake mode for controlling said frictional braking system;
    providing an electronic latch in communication with said brake command, said electronic latch having a first state and a second state;
    providing a brake pedal in communication with said brake command and said electronic latch;
    providing a momentary switch in communication with said electronic latch;
    engaging said normal mode of said brake command when said electronic latch is in said first state;
    switching said electronic latch from said first state to said second state when said brake pedal is depressed beyond a threshold and said momentary switch is engaged;

engaging said parking brake mode of said brake command when said electronic latch is in said second state; and maintaining said state of said electronic latch when unpowered.

15. The method of claim 14, wherein in said normal mode said brake command controls said frictional braking system according to deflection of said brake pedal.

16. The method of claim 15, wherein in said parking brake mode said brake command controls said frictional braking system according to aircraft thrust.

17. The method of claim 14, further including the step of providing an indicator lamp for indicating the state of said electronic latch.

18. The method of claim 14, wherein said electronic latch includes a solid state relay.

19. The method of claim 14, wherein said electronic latch includes a 2-coil latching relay.

20. The method of claim 14, wherein said electronic latch is energized when the brake pedal is depressed.

\* \* \* \* \*